April 25, 1950     P. O. STEWART     2,505,693
APPARATUS FOR ANALYZING FLUIDS
Filed Nov. 10, 1948
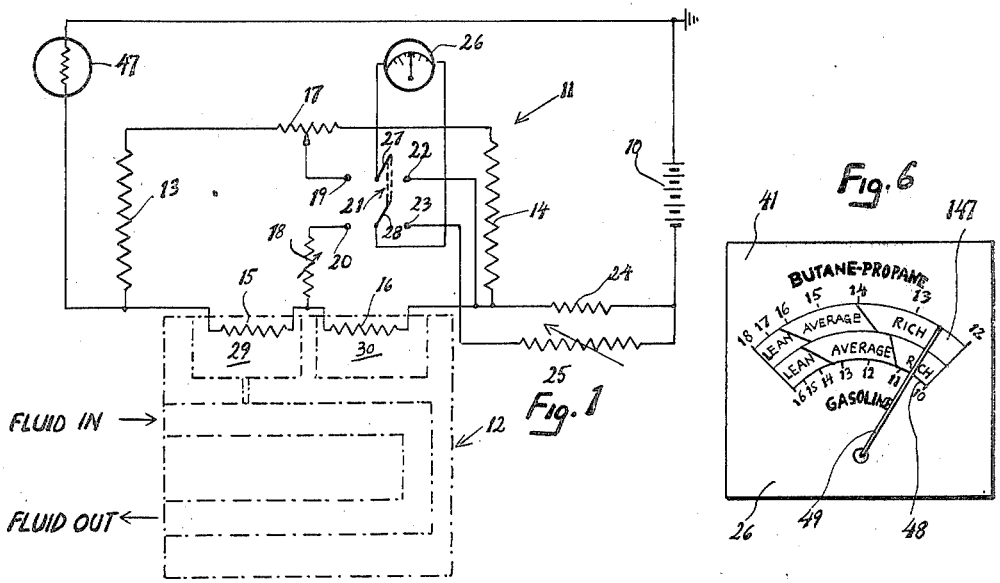
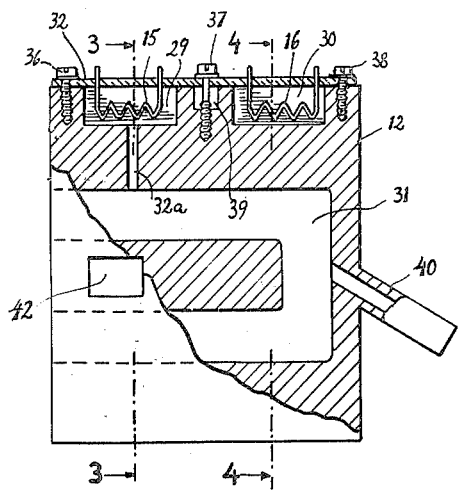
Fig.2
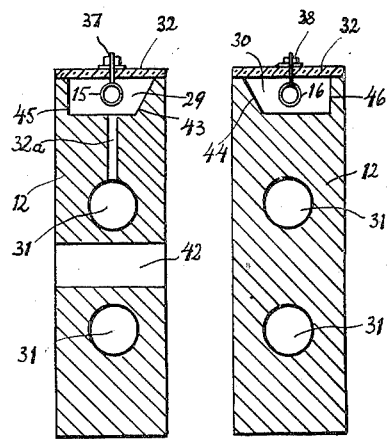
Fig.3
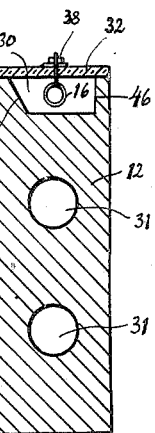
Fig.4
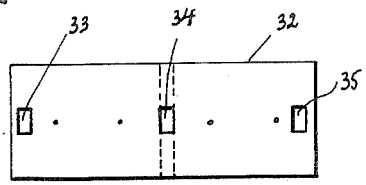
Fig.5
INVENTOR.
PATTERSON O. STEWART
BY
Karl F. Ross
AGENT Patented Apr. 25, 1950

2,505,693

UNITED STATES PATENT OFFICE 2,505,693

APPARATUS FOR ANALYZING FLUIDS

Patterson O. Stewart, Bronxville, N. Y.

Application November 10, 1948, Serial No. 59,389

3 Claims. (Cl. 73—27)

The present inention relates to apparatus for analyzing fluid, more particularly (but not exclusively) for analyzing the exhaust gases of internal combustion engines.

Analyzers for exhaust gases and the like, making use of the different thermal conductivity of fluids of different character (e. g. mixtures wherein the proportions of the ingredients vary), are well known. Such analyzers usually employ a pair of resistance elements having a high temperature coefficient of resistance, one element while traversed by current being cooled by the fluid to be tested, the other element being similarly cooled by a control fluid (preferably air) maintained at the same temperature as the test fluid. The difference in the resistance of the two elements will then serve as an indication of the thermal conductivity and, hence, of the character or composition of the fluid under test. This difference in resistance may be conveniently measured in a bridge circuit, the two resistance elements forming respective arms of the bridge which are preferably in series so as to be passed by the same current, disregarding the small current flow through the meter or indicator connected diagonally across the bridge. Unless, however, the thermal conductivity of the walls nearest the respective resistance elements is taken into account, the readings of the meter will be affected and errors will result.

It is an object of the invention to provide, in an analyzer of the character described, indicator means in combination with a thermo-conductivity cell designed in such manner as to eliminate the source of errors referred to.

Another object is to provide an analyzer of this character wherein the said indicator means permits readings to be taken for a plurality of different fluids.

It is a further object of the present invention to provide, in an analyzer of the character described, a thermo-conductivity cell having improved means for establishing the initial balance of the measuring circuit.

It is still another object of this invention to provide an improved bridge circuit for measuring purposes.

A yet further object of the instant invention is to provide a method of balancing an apparatus of the character described.

The above and other objects of the invention will become apparent from the following description of a preferred embodiment, reference being had to the accompanying drawing in which:

Fig. 1 is a circuit diagram illustrating the general circuit arrangement of an apparatus according to the invention;

Fig. 2 is a sectional elevation of a thermo-conductivity cell used in the apparatus illustrated in Fig. 1;

Figs. 3 and 4 are sections taken on the line 3—3 and 4—4, respectively, of Fig. 2;

Fig. 5 is a top plan view of the cover of the cell shown in Figs. 2-4; and

Fig. 6 shows a preferred form of the indicator used in the arrangement of Fig. 1.

Referring first to Fig. 1, there is shown a source of current, schematically indicated as a battery 10 having a grounded positive and an ungrounded negative terminal, a bridge circuit, generally indicated at 11, connected across said source, and a thermo-conductivity cell 12 associated with the circuit 11 in a manner presently to be described. The circuit 11 comprises two fixed resistors 13, 14, preferably of the same magnitude, and two resistance elements 15, 16 forming one series branch of a Wheatstone bridge the other series branch of which is represented by the resistors 13, 14. A small balancing resistor 17 is inserted between the arms 13, 14 of the bridge. Resistor 17 is a potentiometer whose movable tap represents one diagonal point of the bridge, the opposite diagonal point being represented by the junction of resistors 15, 16. Between these two points there is connected a calibrating resistor 18 in series with terminals 19, 20 of a double-pole, double-throw switch 21; the other two terminals 22, 23 of the switch 21 are connected to the negative pole of the battery 10 by way of a small fixed resistor 24 and a large variable resistor 25, respectively.

An indicator 26 is connected across the contact blades 27, 28 of the switch 21. This indicator may be a voltmeter calibrated in percentages of a particular ingredient of the mixture to be tested, or in any other convenient units. Preferably, the indicator 26 is of the type shown in Fig. 6 and described hereinbelow. When the switch 21 is thrown into its left-hand position, the meter 26 will be connected across the diagonal of the bridge and its scale spread will be controlled by the setting of the calibrating resistor 18. When the switch is thrown to the right, the calibration of the meter may be checked by adjusting the rheostat 25 to some predetermined position or positions.

As more clearly seen in Figs. 2, 3 and 4, the resistance elements 15 and 16 are located in respective chambers 29, 30 of the cell 12. A U-shaped channel 31 extends within the body of the cell 12 and serves for the circulation of the fluid to be tested, this channel communicating with the chamber 29 by way of an orifice 32a so that the fluid may enter this chamber. Chamber 30 is completely sealed off by the right-hand portion (as viewed in Fig. 2) of a cover 32, common to both chambers, and contains a control fluid such as air. If desired, a passage (not shown) may be provided for connecting the chamber 30 with a source of control fluid; where, however, the control fluid is air, it has been found that the provision of such a passage is unnecessary since, in practice, enough leakage paths will exist between the atmosphere and the chamber 30 to prevent undue degeneration of the air entrapped therein.

The cover 32, shown in plan view in Fig. 5, is provided with three elongated mounting holes 33, 34 and 35 through which pass screws 36, 37 and 38, respectively, these screws being received in threaded bores provided in the cell 12. The elements 15, 16 are suspended from the cover and have their extremities extending therethrough for connection to other elements of the circuit shown in Fig. 1. Cover 32 is preferably made of a plastic, resinous material, e. g. a phenol formaldehyde condensation product such as is known by the name "Bakelite." Since this material has a certain porosity, I prefer to cut away a portion of it, shown between dotted lines in Fig. 5, in order to sever a possible seepage path between the two chambers through which fluid from chamber 29 might enter chamber 30. As a further means for preventing seepage, the partition separating the two chambers may be recessed as indicated at 39.

The cell 12 is also provided with a tubular extension or nipple 40 through which scavenging air may be introduced into the channel 31, e. g. when it is desired to check the balance of the bridge circuit 11. It will be understood that the nipple 40 is normally closed by suitable means (not shown).

The cell 12 may also be provided with a mounting hole 42 through which a lug, bracket or other mounting means, not shown, may be passed for the purpose of securing the cell to any convenient support.

From the description given so far it will be understood that the exhaust gases or other fluids passing through the channel 31 will heat up (or possibly cool) the body of cell 12 and thereby maintain the ambient temperature in both chambers 29 and 30 at substantially the same level. Current from source 10, passing through elements 15 and 16 in series, will heat these elements, the heat generated being conducted by the surrounding fluids to the walls of chambers 29, 30, respectively, where it is dissipated by the metal of the cell body. Since the test fluid in chamber 29 and the control fluid in chamber 30 ordinarily will have different conductivity, the two elements will reach different operating temperatures; this, in turn, will cause the resistivity of these elements and, thereby, the voltage drop thereacross to differ in a manner which is a function of the difference in thermal conductivity of the two fluids. The difference in voltage drop will unbalance the bridge and will deflect the pointer of indicator 26 in well known manner.

It will be apparent, however, that the extent of the pointer's deflection will depend not only on the degree of unbalance between resistance elements 15 and 16 but also on the magnitude of the voltage applied across the input diagonal of the bridge, and that, therefore, any fluctuation in this voltage will seriously affect the reading obtained. Accordingly, it is necessary to take special precautions if the apparatus shown in Fig. 1 is to be connected to an ordinary, commercial source of power such as a car battery or the common utility mains. These precautions preferably take the form of a constant current device 47 connected to the source 10 in series with the circuit 11. Such a device may comprise a length of wire having a high temperature coefficient of resistance, this wire being hermetically sealed in an envelope filled with a gas of high heat conductivity. A device of this character, using an iron wire and a bulb filled with hydrogen or helium, is commercially available under the name "Amperite."

The device 47 causes the two parallel arms 13, 17, 14 and 15, 16 to be traversed by a current which is essentially constant, thereby maintaining a constant voltage drop across the input diagonal of the bridge under all operating conditions. The potential difference across the output diagonal, in which the meter 26 is connected, will therefore depend solely on the degree of unbalance between the resistance elements 15 and 16, being thus a function of the thermal conductivity of the test fluid independent of the voltage of battery 10. It will be understood that, for the purpose of fixing the zero position of the meter, scavenging air may be admitted through the nipple 40 (as previously described) and, after thermal equilibrium has been established, the slider of potentiometer 17 may be displaced until a zero reading is obtained.

It has been found, however, that a source of error resides in the spacing between each chamber wall and the respective resistance element 15, 16, since a greater proximity of the wall to the element will effect a more rapid cooling of the latter (assuming, of course, that the current heats elements 15, 16 to a temperature above that of the cell 12). According to another feature of the invention, means is provided for adjusting the effective spacing between these walls and elements until the cooling effect of each wall upon the associated resistance element is the same. In accordance with this feature of the invention, the bridge is first balanced with the cover 32, carrying the resistance elements 15, 16, removed from the body of cell 12; thereafter, the cover is placed upon the cell, screws 36, 37 and 38 are inserted into openings 33, 34 and 35, respectively, and are tightened sufficiently to prevent spontaneous displacement of the cover while still enabling the same to be moved transversely, e. g. on being tapped with a hammer, and the cover is then shifted until balance is again obtained. It will be noted that each chamber 29, 30 is provided with a beveled or sloping wall 43, 44 (Figs. 3 and 4) which is closer to the respective element 15, 16 than is the opposite, vertical wall 45, 46; these beveled walls are provided at opposite sides of the two chambers, hence any transverse displacement of the cover 32 will increase the distance of one and decrease the distance of the other element from the associated beveled wall, whereby the heat dissipating effect of the walls of chambers 29, 30 may be differentially varied until a zero reading is again obtained. After balance is thus achieved, the screws are tightened, whereupon the cover 32 may be bisected as previously described.

It will be appreciated that the beveling of the walls 43, 44 enables the same to act as control surfaces without, at the same time, materially reducing the volume of the chambers 29, 30 for any given width of the cell 12. Evidently, it will also be possible to dispose the beveled or control surfaces on the same side, in which case differential adjustment may be obtained by pivoting of the cover 32 about its center opening 34 rather than by the transverse movement referred to.

As shown in Fig. 6, the indicator 26 is provided with a dial 41 carrying an upper scale 147 and a lower scale 48, both cooperating with a common pointer 49. These two scales serve to indicate the percentages of the respective fuels in different air-fuel mixtures, the fuels being shown by way of example as a butane-propane mixture in the case of scale 147 and gasoline in the case of scale 48. It will be obvious, however, that three or more scales may be employed instead of the two illustrated, and that the fluids to be analyzed need not be those specifically mentioned above.

While the invention has been described with reference to a single, preferred embodiment only, it is to be understood that the same is capable of various adaptations and modifications without departing from its spirit or exceeding its scope as defined in the objects and in the appended claims.

I claim:

1. In apparatus for analyzing fluids, a thermoconductivity cell comprising a body of metal, said body having two separated chambers, a channel system in said body, a passage connecting one of said chambers with said channel system, said channel system having inlet and outlet means for passing a fluid therethrough and into one of said chambers, cover means overlying said chambers as a closure therefor, a pair of resistance elements carried on said cover means so as to extend within said chambers, respectively, the other of said chambers being adapted to contain a control fluid, each chamber being provided with a first wall perpendicular to the chamber bottom and a second wall opposite said first wall and extending at an angle other than 90° with said chamber bottom, said two walls being substantially parallel to the associated resistance element, and mounting means permitting a displacement between said cover means and said cell body for varying the spacing between each resistance element and the walls of the respective chamber.

2. In apparatus for analyzing fluids, a thermoconductivity cell according to claim 1 wherein said second walls are provided on opposite sides of said two chambers, respectively.

3. In apparatus for analyzing fluids, a thermoconductivity cell according to claim 2, wherein said mounting means comprises a plurality of screws threaded into said body, said cover means being provided with elongated openings receiving said screws so as to permit a transverse displacement of said cover means.

PATTERSON O. STEWART.

REFERENCES CITED

The following references are of record in the file of this patent:

UNITED STATES PATENTS

| Number | Name | Date |
|---|---|---|
| 1,698,887 | Krueger | Jan. 15, 1929 |
| 2,256,395 | Laub | Sept. 16, 1941 |
| 2,269,850 | Hebler | Jan. 13, 1942 |
| 2,389,615 | Eder | Nov. 27, 1945 |